US010839828B2

(12) United States Patent
Le et al.

(10) Patent No.: US 10,839,828 B2
(45) Date of Patent: Nov. 17, 2020

(54) MAGNETIC WRITE HEAD WITH CURRENT GUIDING LAYER

(71) Applicant: Western Digital Technologies, Inc., San Jose, CA (US)

(72) Inventors: Quang Le, San Jose, CA (US); Hongquan Jiang, San Jose, CA (US); Michael Kuok San Ho, Emerald Hills, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/277,830

(22) Filed: Feb. 15, 2019

(65) Prior Publication Data

US 2019/0251991 A1 Aug. 15, 2019

Related U.S. Application Data

(63) Continuation of application No. 16/146,122, filed on Sep. 28, 2018, now abandoned.
(Continued)

(51) Int. Cl.
*G11B 5/235* (2006.01)
*G11B 5/127* (2006.01)
(Continued)

(52) U.S. Cl.
CPC ............ *G11B 5/235* (2013.01); *G11B 5/1278* (2013.01); *G11B 5/314* (2013.01); *G11B 5/315* (2013.01);
(Continued)

(58) Field of Classification Search
None
See application file for complete search history.

(56) References Cited

U.S. PATENT DOCUMENTS

| 6,252,749 B1 | 6/2001 | Hayakawa |
| 8,462,461 B2 | 6/2013 | Braganca et al. |

(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

M. Mallary et al., "Head and Media Challenges for 3 Tb/in(2) Microwave-Assisted Magnetic Recording"; https://www.researchgate.net/publication/261177415_Head_and_Media_Challenges_for_3_Tbin_Microwave-Assisted_Magnetic_Recording; Aug. 2013 (23 pages).
(Continued)

*Primary Examiner* — Craig A. Renner
(74) *Attorney, Agent, or Firm* — Patterson & Sheridan, LLP; Steven H. Versteeg

(57) ABSTRACT

The present disclosure generally relates to data storage devices, and more specifically, to a magnetic media drive employing a magnetic recording head. The head includes a trailing shield, a main pole, side shields surrounding at least a portion of the main pole, and a structure disposed between the trailing shield and the main pole. The structure includes one or more layers and a seed layer. The seed layer is connected to one or more electrical leads to provide an electrical path from the leads to the one or more layers during operation. The seed layer guides the electrical current to the one or more layers and improves heat dissipation of the one or more layers, leading to a reduction in hot spots formed in the one or more layers.

36 Claims, 11 Drawing Sheets

Related U.S. Application Data

(60) Provisional application No. 62/607,767, filed on Dec. 19, 2017.

(51) Int. Cl.
  *G11B 5/31* (2006.01)
  *G11B 5/00* (2006.01)

(52) U.S. Cl.
  CPC .... *G11B 5/3146* (2013.01); *G11B 2005/0024* (2013.01)

(56) References Cited

U.S. PATENT DOCUMENTS

| | | | |
|---|---|---|---|
| 8,472,135 B1 | 6/2013 | Kusukawa et al. | |
| 8,582,240 B1 | 11/2013 | Chen et al. | |
| 8,842,387 B1 | 9/2014 | Horide et al. | |
| 8,929,031 B2 | 1/2015 | Takeo et al. | |
| 8,995,088 B1 | 3/2015 | Boone et al. | |
| 9,001,465 B1* | 4/2015 | Shimizu et al. | G11B 5/3146 360/125.3 |
| 9,099,113 B1 | 8/2015 | Futumoto et al. | |
| 9,230,571 B1 | 1/2016 | Chen et al. | |
| 9,275,672 B2 | 3/2016 | Shiroishi et al. | |
| 9,311,934 B1 | 4/2016 | Shiimoto et al. | |
| 9,368,135 B2 | 6/2016 | Gao | |
| 9,881,637 B1 | 1/2018 | Wilson et al. | |
| 9,899,042 B1* | 2/2018 | Venugopal et al. | G11B 5/3146 |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2005/0068671 A1 | 3/2005 | Hsu et al. | |
| 2005/0280935 A1* | 12/2005 | Clinton et al. | G11B 5/315 360/125.32 |
| 2008/0304176 A1 | 12/2008 | Takagishi et al. | |
| 2009/0059423 A1 | 3/2009 | Yamada et al. | |
| 2009/0080120 A1* | 3/2009 | Funayama et al. | G11B 5/1278 360/319 |
| 2009/0109570 A1* | 4/2009 | Scholz et al. | G11B 5/1278 360/129 |
| 2009/0310244 A1 | 12/2009 | Shimazawa et al. | |
| 2009/0316304 A1 | 12/2009 | Funayama et al. | |
| 2012/0170156 A1 | 7/2012 | Sasaki et al. | |
| 2012/0314326 A1* | 12/2012 | Takeo et al. | G11B 5/3146 360/125.03 |
| 2013/0057981 A1 | 3/2013 | Urakami et al. | |
| 2013/0063837 A1* | 3/2013 | Udo et al. | G11B 5/3146 360/75 |
| 2013/0250456 A1 | 9/2013 | Yamada et al. | |
| 2014/0139952 A1 | 5/2014 | Takeo et al. | |
| 2014/0177100 A1 | 6/2014 | Sugiyama et al. | |
| 2015/0015992 A1* | 1/2015 | Funayama | G11B 5/235 360/119.04 |
| 2015/0043106 A1* | 2/2015 | Yamada et al. | G11B 5/1278 360/123.05 |
| 2015/0109699 A1* | 4/2015 | Boone et al. | G11B 5/3146 360/125.32 |
| 2016/0027455 A1 | 1/2016 | Kudo et al. | |
| 2016/0218728 A1* | 7/2016 | Zhu | G11B 5/235 |
| 2017/0092304 A1* | 3/2017 | Koizumi et al. | G11B 5/3146 |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

International Search Report and Written Opinion issued in corresponding International Patent Application No. PCT/US2018/053225, dated Jan. 29, 2019 (13 pages).

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

MAGNETIC WRITE HEAD WITH CURRENT GUIDING LAYER

CROSS-REFERENCE TO RELATED APPLICATIONS

This application is a continuation of co-pending U.S. patent application Ser. No. 16/146,122, filed Sep. 28, 2018, which claims benefit of U.S. Provisional Patent Application Ser. No. 62/607,767, filed Dec. 19, 2017. Each of the aforementioned related patent applications is herein incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a MAMR stack disposed between the trailing shield and the main pole to improve write field and/or field gradient, leading to better areal density capability (ADC). The MAMR stack may include a seed layer and at least one magnetic layer, such as a spin torque layer (STL) that is magnetized by a bias current from the main pole to the MAMR stack during operation. Alternatively, the MAMR stack may be a spin torque oscillator (STO) for generating a microwave (high frequency AC magnetic field). When a bias current is conducted to the STO from the main pole, the STO oscillates and provides an AC magnetic field to the recording medium. The AC magnetic field may reduce the coercive force of the recording medium, thus high quality recording by MAMR may be achieved.

However, Joule heating induced by the bias current from the main pole to the MAMR stack creates hot spots in the MAMR stack. Hot spots that are exposed to atmosphere and moisture, such as at the media facing surface (MFS), lead to corrosion of the MAMR stack.

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a trailing shield, a main pole, side shields surrounding at least a portion of the main pole, and a structure disposed between the trailing shield and the main pole. The structure includes one or more layers and a seed layer. The seed layer is connected to one or more electrical leads to provide an electrical path from the leads to the one or more layers during operation. The seed layer guides the electrical current to the one or more layers and improves heat dissipation of the one or more layers, leading to a reduction in hot spots formed in the one or more layers. The seed layer also helps moving hot spots formed in the one or more layers away from the MFS.

In one embodiment, a magnetic recording head including a trailing shield, a main pole, a structure disposed between the main pole and the trailing shield, wherein the structure includes a non-magnetic electrically conductive layer disposed on and in contact with the main pole at a media facing surface, and one or more layers disposed on the non-magnetic electrically conductive layer. The magnetic recording head further includes an electrically conductive material disposed on the non-magnetic electrically conductive layer at one or more locations recessed from the media facing surface.

In another embodiment, a magnetic recording head including a trailing shield, a main pole, side shields surrounding at least a portion of the main pole, and a structure disposed between the trailing shield and the main pole. The structure includes a non-magnetic electrically conductive layer disposed over the main pole and the side shields, wherein the non-magnetic electrically conductive layer is disposed over the side shields at a location recessed from a media facing surface, and one or more layers disposed on the non-magnetic electrically conductive layer.

In another embodiment, a magnetic recording head including a trailing shield, a main pole, side shields surrounding at least a portion of the main pole, and a structure disposed between the trailing shield and the main pole. The structure includes a non-magnetic electrically conductive layer disposed over the main pole and the side shields, wherein the non-magnetic electrically conductive layer comprises a first portion, a second portion separated from the first portion by a first dielectric layer, and a third portion connecting the first portion and the second portion, wherein the first portion and the second portion are recessed from a media facing surface, and the third portion is disposed over the main pole and the side shields at locations recessed from the media facing surface. The structure further includes one or more layers disposed on the non-magnetic electrically conductive layer.

In another embodiment, a magnetic recording head including a main pole, and a structure disposed on the main pole. The structure includes one or more layers, and means for providing a path for a first electrical current to flow to the one or more layers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a trailing shield, a main pole, side shields surrounding at least a portion of the main pole, and a structure disposed between the trailing shield and the main pole. The structure includes one or more layers and a seed layer. The seed layer is connected to one or more electrical leads to provide an electrical path from the leads to the one or more layers during operation. The seed layer guides the electrical current to the one or more layers and improves heat dissipation of the one or more layers, leading to a reduction in hot spots formed in the one or more layers. The seed layer also helps moving hot spots formed in the one or more layers away from the MFS.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
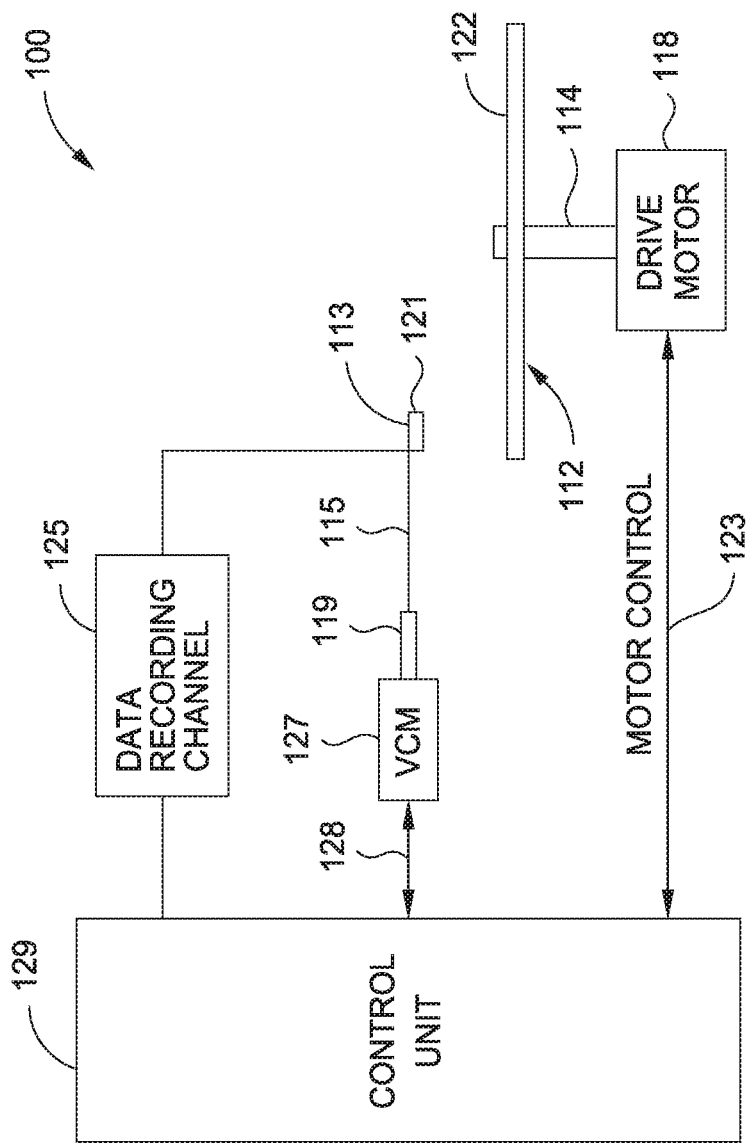
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that include a structure having a seed layer for guiding an electrical current to one or more layers formed on the seed layer and for heat dissipation of the one or more layers. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
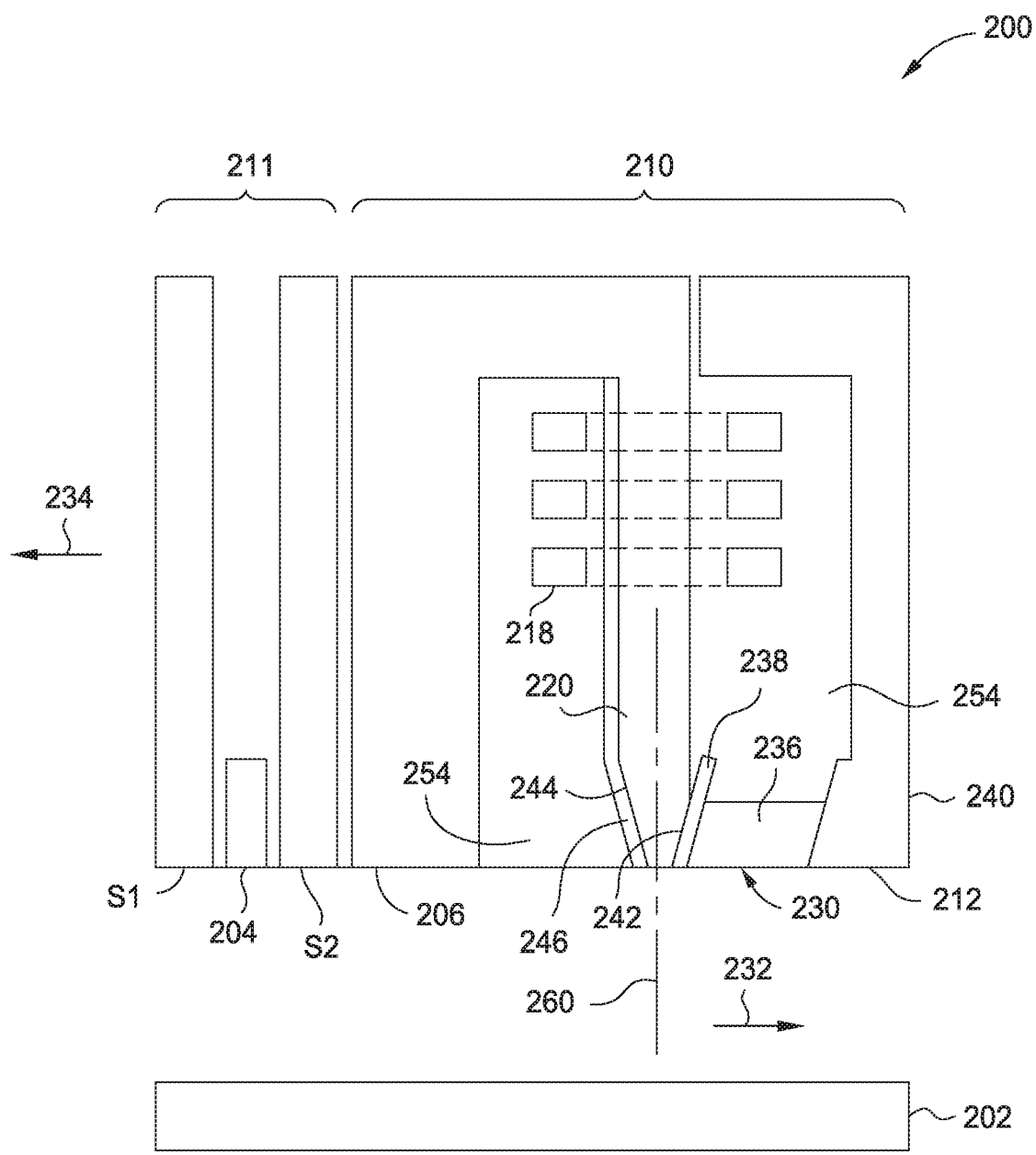
FIG. 2 is a fragmented, cross sectional side view of a magnetic read/write head facing a magnetic disk according to one embodiment.

FIG. 2 is a fragmented, cross sectional side view of a magnetic read/write head 200 facing the magnetic disk 202 according to one embodiment. The magnetic disk 202 may correspond to the magnetic disk 112 described above in regards to FIG. 1. The magnetic read/write head 200 may correspond to the magnetic head assembly 121 described above in regards to FIG. 1. The magnetic read/write head 200 includes a MFS 212, such as an air bearing surface (ABS), facing the disk 202, a magnetic write head 210, and a magnetic read head 211. As shown in FIG. 2, the magnetic disk 202 moves past the write head 210 in the direction indicated by the arrow 232 and the magnetic read/write head 200 moves in the direction indicated by the arrow 234.

In some embodiments, the magnetic read head 211 is a magnetoresistive (MR) read head that includes an MR sensing element 204 disposed between MR shields S1 and S2. In other embodiments, the magnetic read head 211 is a magnetic tunnel junction (MTJ) read head that includes a MTJ sensing device 204 disposed between MR shields S1 and S2. The magnetic fields of the adjacent magnetized regions in the magnetic disk 202 are detectable by the MR (or MTJ) sensing element 204 as the recorded bits.

The write head 210 includes a main pole 220, a leading shield 206, a trailing shield 240, a structure 230 disposed between the main pole 220 and the trailing shield 240, and a coil 218 that excites the main pole 220. The coil 218 may have a "pancake" structure which winds around a back-contact between the main pole 220 and the leading shield 206, instead of a "helical" structure shown in FIG. 2. The structure 230 is in contact with the main pole 220. A dielectric material 254 is disposed between the leading shield 206 and the main pole 220. In one embodiment, the dielectric material 254 is aluminum oxide. In one embodiment, a non-magnetic electrically conductive structure 246 is disposed between the dielectric material 254 and the main pole 220. The non-magnetic electrically conductive structure 246 surrounds a portion of the main pole 220 at the MFS 212. The non-magnetic electrically conductive structure 246 is fabricated from a non-magnetic electrically conductive metal, such as NiTa, Cr, Cu, or Rh. In some embodiments, the non-magnetic electrically conductive structure 246 is fabricated from a multi-layer stack, such as NiTa/Ru, Cr/Cu, or Cr/Rh.

The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo alloy. The leading shield 206 and the trailing shield 240 may be a magnetic material, such as NiFe alloy.

The structure 230 includes a seed layer 238 and one or more layers 236. The seed layer 238 may be a single layer or a layer stack including more than one layer. The seed layer 238 is fabricated from a non-magnetic electrically conductive material, such as a non-magnetic metal or alloy, for example copper (Cu), chromium (Cr), tantalum (Ta), ruthenium (Ru), tungsten (W), gold (Au), silver (Ag), tin (Sn), molybdenum (Mo), iridium (Ir), platinum (Pt), or rhodium (Rh). In one embodiment, the one or more layers 236 include a magnetic layer, such as a STL, and a spacer layer. In one embodiment, the magnetic layer is NiFe, CoMnGe, CoFe, or combinations thereof. The spacer layer is fabricated from a material such as Cu or AgSn. In another embodiment, the one or more layers 236 includes a first magnetic layer, such as a spin polarization layer (SPL), a second magnetic layer, such as a field generation layer (FGL), and an interlayer disposed between the SPL and the FGL. In yet another embodiment, the one or more layers 236 is a single non-magnetic metal layer. As shown in FIG. 2, the seed layer 238 extends further away from the MFS 212 than the one or more layers 236, i.e., the seed layer 238 has a stripe height that is substantially greater than the stripe height of each of the one or more layers 236.

Figure 3A:
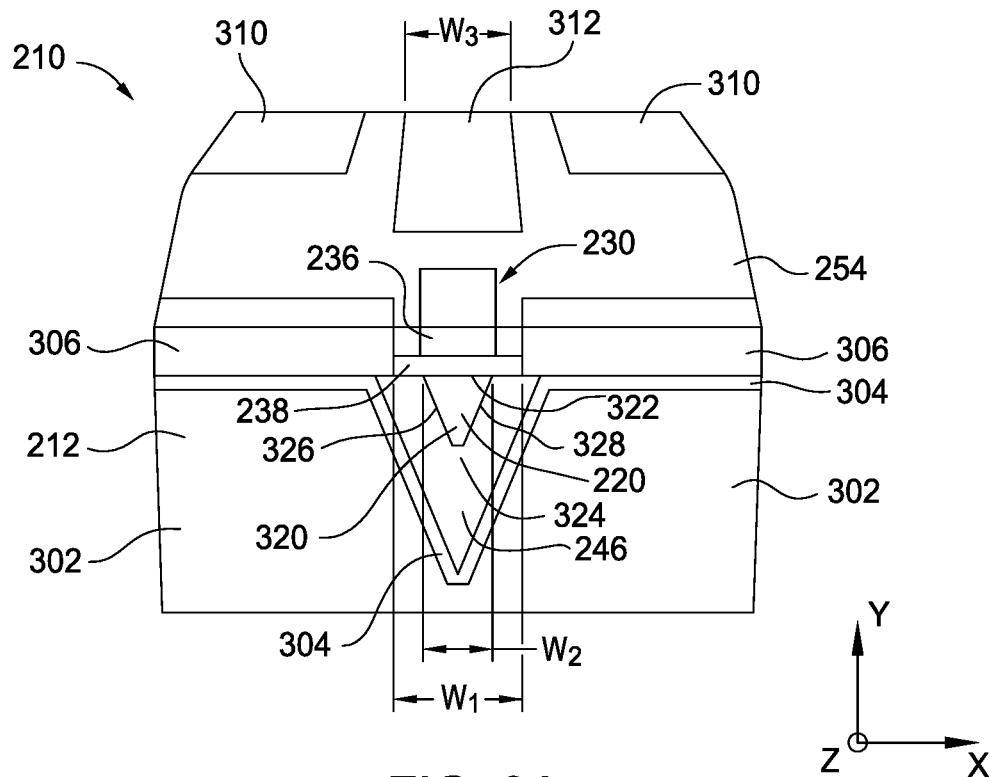
FIG. 3A is a perspective MFS view of a portion of a write head of FIG. 2 according to one embodiment.

FIG. 3A is a perspective MFS view of a portion of the write head 210 of FIG. 2 according to one embodiment. As shown in FIG. 3A, the write head 210 includes the main pole 220, the structure 230 disposed on the main pole 220, the non-magnetic electrically conductive structure 246 surrounding a portion of the main pole 220, and side shields 302 surrounding the non-magnetic electrically conductive structure 246. The definition of the term "surround" includes having an intermediate material between a first element that is surrounding a second element and the second element that is being surrounded by the first element. For example, a dielectric material 304 is disposed between the non-magnetic electrically conductive structure 246 and the side shields 302. The dielectric material 304 is disposed on and in contact with the side shields 302, as shown in FIG. 3A. The main pole 220 includes a first surface 320 at the MFS 212, a second surface 322 adjacent to the first surface 320, a third surface 324 opposite the second surface 322, a fourth surface 326 connected to the second surface 322, and a fifth surface 328 opposite the fourth surface 326. In one embodiment, the non-magnetic electrically conductive structure 246 surrounds the third surface 324, the fourth surface 326, and the fifth surface 328 of the main pole 220. In one embodiment, the non-magnetic electrically conductive structure 246 is replaced with the dielectric material 304, and the dielectric material 304 is in contact with the main pole 220 and the side shields 302.

The structure 230 includes the seed layer 238, and the seed layer 238 is disposed on and in contact with the second surface 322 of the main pole 220. The seed layer 238 has a width $W_1$ at the MFS 212 in the cross-track direction, as indicated by the X-axis. The one or more layers 236 each has a width $W_2$ at the MFS 212 in the cross-track direction, as indicated by the X-axis. The width $W_1$ of the seed layer 238 at the MFS 212 is substantially greater than the width $W_2$ at the MFS 212. The seed layer 238 is also disposed on and in contact with the non-magnetic electrically conductive structure 246.

The structure 230 is disposed between two dielectric layers 306, and the dielectric layers 306 are disposed on and in contact with the dielectric material 304. In one embodiment, the dielectric layers 306 are also disposed on and in contact with the non-magnetic electrically conductive structure 246. The dielectric material 304 and the dielectric layers 306 may be fabricated from the same material as the dielectric material 254. In some embodiments, the dielectric material 304 and the dielectric layers 306 are fabricated from a thermally conductive material that is different from the dielectric material 254.

The write head further includes a dielectric layer 312 at a location recessed from the MFS 212. The dielectric layer 312 may be disposed on the main pole 220 and may be aligned with the structure 230. The dielectric layer 312 has a width $W_3$ in the cross-track direction, as indicated by the X-axis. The width $W_3$ of the dielectric layer 312 is substantially greater than the width $W_2$ of the one or more layers 236. In one embodiment, the width $W_3$ of the dielectric layer 312 is substantially the same as the width $W_1$ of the seed layer 238 at the MFS 212. The dielectric layer 312 may be fabricated from the same material as the dielectric material 254 or from a thermally conductive material that is different from the dielectric material 254. The thermally conductive dielectric material 304, dielectric layers 306, and dielectric layer 312 improve heat dissipation of the one or more layers 236 at the MFS 212.

One or more electrical leads 310 are disposed on the seed layer 238 at one or more locations recessed from the MFS 212 for flowing an electrical current to the one or more layers 236 via the seed layer 238. In one embodiment, there are two electrical leads 310. The electrical leads 310 may be fabricated from an electrically conductive material, such as a metal. The dielectric layer 312 may be disposed between the two electrical leads 310, as shown in FIG. 3A. The dielectric material 254 is disposed on the seed layer 238 between the one or more layers 236 and the dielectric layers 306, between the one or more layers 236 and the dielectric layer 312, and between the dielectric layers 306 and the electrical leads 310. In one embodiment, the dielectric material 304, the dielectric layers 306, and the dielectric layer 312 are fabricated from the same material as the dielectric material 254. The trailing shield 240 (FIG. 2) is disposed on the dielectric layers 306, the dielectric material 254, and the one or more layers 236. The trailing shield 240 (FIG. 2) is electrically isolated from the electrical leads 310. In one embodiment, the electrical leads 310 are disposed on the seed layer 238 at a location that is further recessed from the MFS 212 than the trailing shield 240.

Figure 3B:
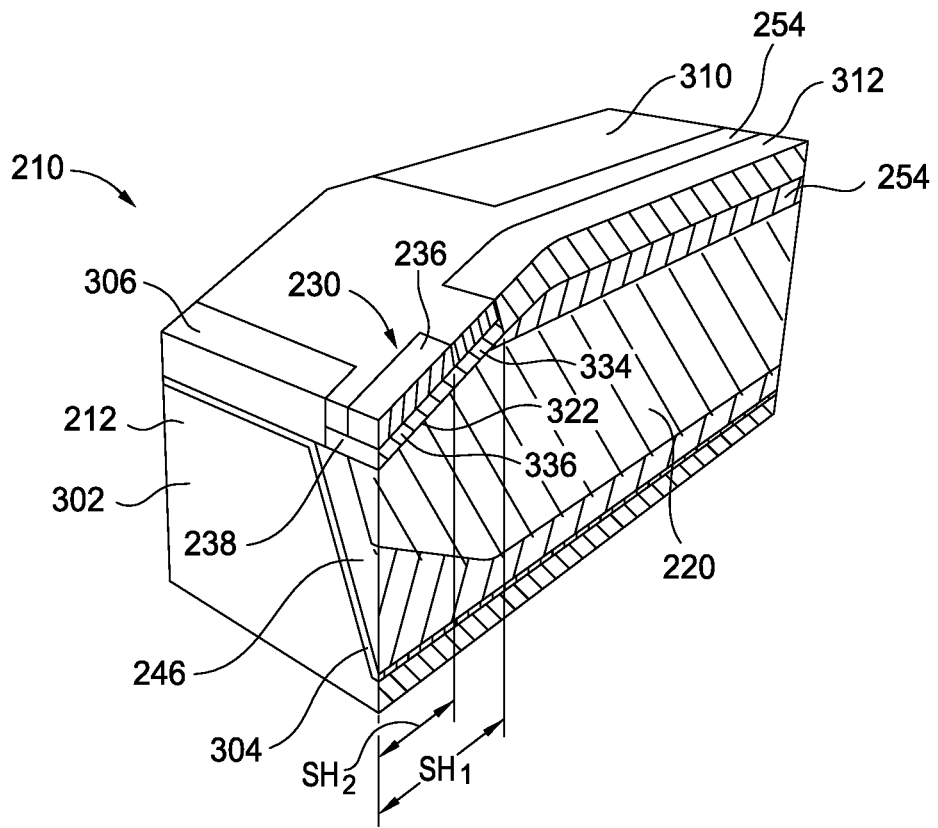
FIG. 3B is a perspective cross sectional view of the portion the write head of FIG. 3A according to one embodiment.

FIG. 3B is a perspective cross sectional view of the portion the write head 210 of FIG. 3A according to one embodiment. As shown in FIG. 3B, the seed layer 238 is disposed on and in contact with the surface 322 of the main pole 220. The surface 322 may be the trailing taper 242 shown in FIG. 2. The seed layer 238 has a first portion 330 (FIG. 3C), a second portion 332 (FIG. 3C), a third portion 334, and a fourth portion 336. As shown in FIG. 3B, the third portion 334 extends from the dielectric layer 312 to the dielectric layers 306, and the fourth portion 336 extends from the third portion 334 to the MFS 212. The seed layer 238 has a stripe height $SH_1$ that is substantially greater than a stripe height $SH_2$ of the one or more layers 236. Thus, the dielectric layer 312 is butted against the seed layer 238, and the dielectric material 254 is disposed between the one or more layers 236 and the dielectric layer 312. The stripe height $SH_1$ of the seed layer 238 ranges from about one time to about five times the stripe height $SH_2$ of the one or more layers 236. The stripe height $SH_2$ may be the same as the track width or four times the track width. In one embodiment, the one or more layers 236 is a single non-magnetic metal layer, and the stripe height $SH_2$ is about 65 nm, such as from about 40 nm to about 90 nm, in order to improve heat dissipation when more current is flowed into the single non-magnetic metal layer to improve soft error rate (SER). In one embodiment, the dielectric layer 312 is disposed on the main pole 220. In another embodiment, the dielectric material 254 is disposed between the dielectric layer 312 and the main pole 220, as shown in FIG. 3B, and the dielectric layer 312 is fabricated from a different material than the dielectric material 254. In one embodiment, the portion of the seed layer 238 that is in contact with the dielectric layer 312 is disposed on the dielectric material 254.

Figure 3C:
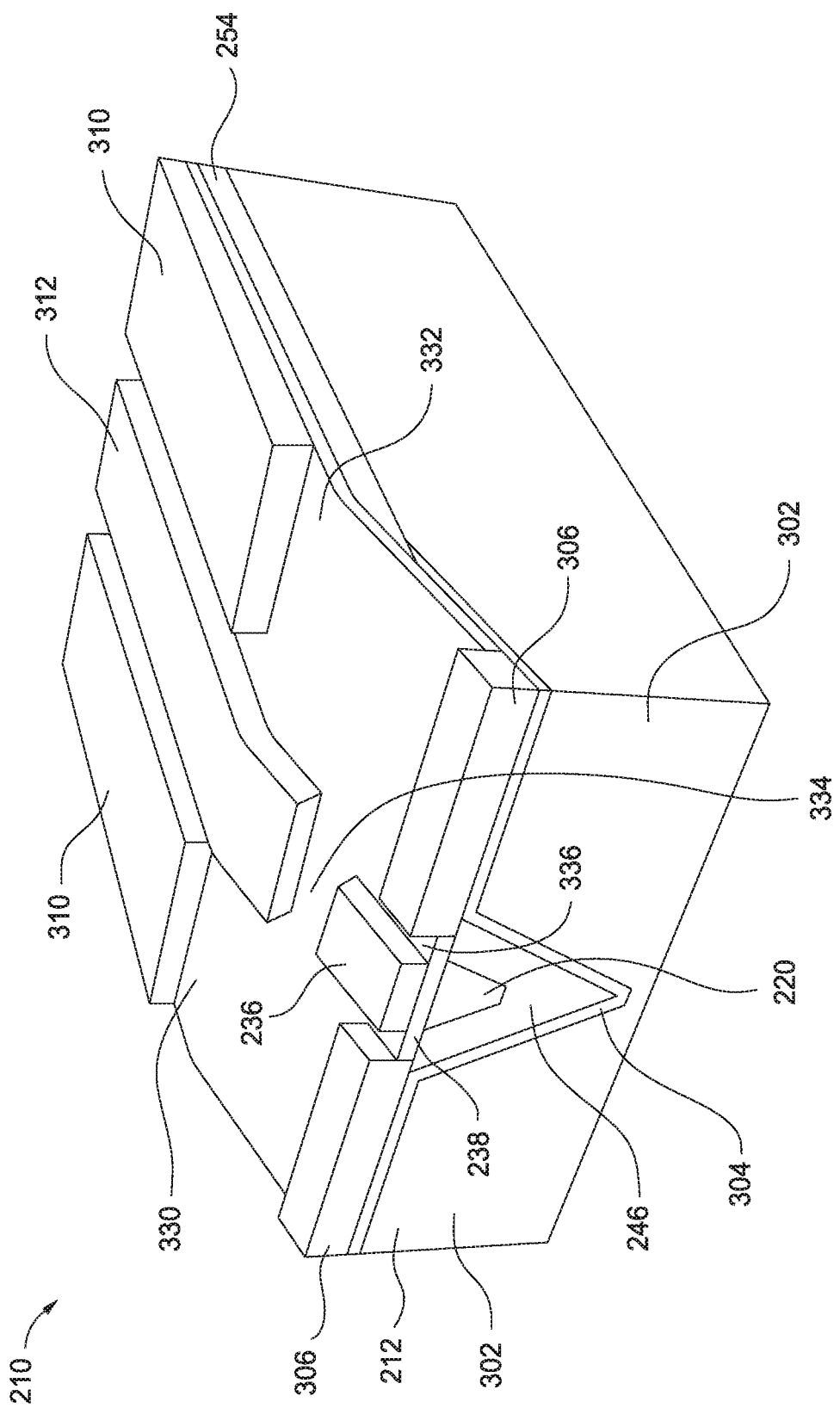
FIG. 3C is a perspective view of the portion of the write head of FIG. 3A without a dielectric layer according to one embodiment.

FIG. 3C is a perspective view of a portion of the write head 210 of FIG. 3A according to one embodiment. The dielectric material 254 disposed on the seed layer 238 is omitted to better illustrate the seed layer 238. As shown in FIG. 3C, the seed layer 238 includes the first portion 330, the second portion 332 separated from the first portion 330 by the dielectric layer 312, the third portion 334 connecting the first portion 330 and the second portion 332, and the fourth portion 336 extending from the third portion 334 to the MFS 212. The stripe height $SH_1$ is the sum of the stripe heights of the third portion 334 and the fourth portion 336. The electrical leads 310 are disposed on the first and second portions 330, 332, and the one or more layers 236 are disposed on the third portion 334 and the fourth portion 336 of the seed layer 238. The first, second, and third portions 330, 332, 334 of the seed layer 238 are recessed from the MFS 212, and the fourth portion 336 extends to the MFS 212. The fourth portion 336 of the seed layer 238 is sandwiched between the dielectric layers 306. In one embodiment, the first and second portions 330, 332 of the seed layer 238 are disposed on and in contact with the dielectric material 254 that is disposed on and in contact with the side shields 302. The dielectric layer 312 may be disposed on the dielectric material 254 that is also disposed on and in contact with the main pole 220 (FIG. 3B). In one embodiment, the third portion 334 of the seed layer 238 is disposed on and in contact with the dielectric material 304 and the main pole 220 at locations recessed from the MFS 212, as shown in FIG. 3C. The fourth portion 336 of the seed layer 238 is disposed on and in contact with the main pole 220 at the MFS 212.

The seed layer 238 having the first, second, third, fourth portions 330, 332, 334, 336 guides the electrical current from the electrical leads 310 to the one or more layers 236, the non-magnetic electrically conductive structure 246, and the main pole 220 while avoiding current crowding at the MFS 212, which directs hot spots formed in the one or more layers 236 away from the MFS 212. Furthermore, because the seed layer 238 is fabricated from a metal, which is a thermally conductive material, the seed layer 238 also helps heat dissipation of the one or more layers 236. In one embodiment, instead of flowing a current to the one or more layers 236 from the electrical leads 310 via the seed layer 238, the current is flowed into the non-magnetic electrically conductive structure 246, the seed layer 238, and the one or more layers 236 from the main pole 220. In another embodiment, a second current is flowed into the non-magnetic electrically conductive structure 246, the seed layer 238, and the one or more layers 236 from the main pole 220 in addition to the current flowing from the seed layer 238 to the one or more layers 236. The currents may be optimized to provide the improved write-ability while minimizing corrosion of the one or more layers 236.

Figure 4A:
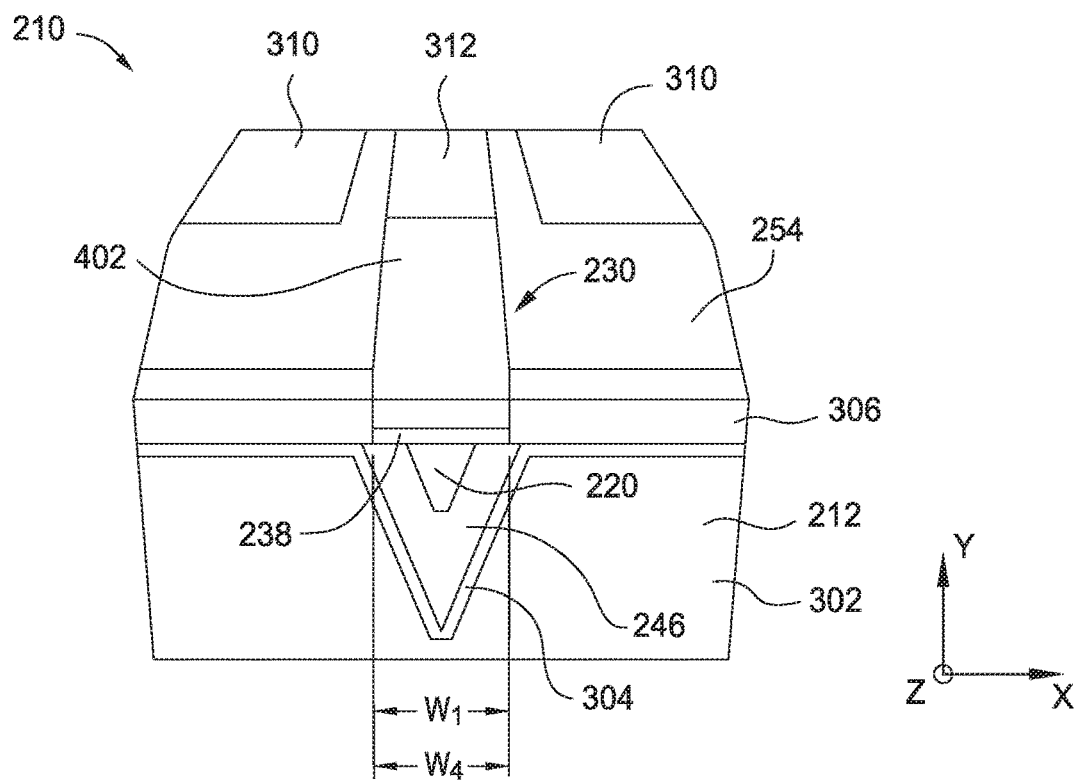
FIG. 4A is a perspective MFS view of a portion of a write head of FIG. 2 according to one embodiment.

FIG. 4A is a perspective MFS view of a portion of the write head 210 of FIG. 2 according to one embodiment. As shown in FIG. 4A, the write head 210 includes the main pole 220, the structure 230, the dielectric layers 306, the non-magnetic electrically conductive structure 246, the dielectric material 304, the dielectric material 254, the dielectric layer 312, the electrical leads 310, and the side shields 302.

The structure 230 includes the seed layer 238 and a non-magnetic gap layer 402 disposed on the seed layer 238. The non-magnetic gap layer 402 is fabricated from a non-magnetic metal, such as Cu, Cr, Ta, Ru, W, Au, Ag, Sn, Mo, Ir, Pt, or Rh. In one embodiment, the non-magnetic gap layer 402 is fabricated from the same material as the seed layer 238. In another embodiment, the non-magnetic gap layer 402 is fabricated from a material different from the seed layer 238. The seed layer 238 has the width $W_1$ at the MFS 212 in the cross-track direction, as indicated by the X-axis. The non-magnetic gap layer 402 has a width $W_4$ at the MFS 212 in the cross-track direction, as indicated by the X-axis. The width $W_1$ of the seed layer 238 at the MFS 212 is substantially the same as the width $W_4$ of the non-magnetic gap layer 402 at the MFS 212. The non-magnetic gap layer 402 is in contact with the dielectric layers 306.

Figure 4B:
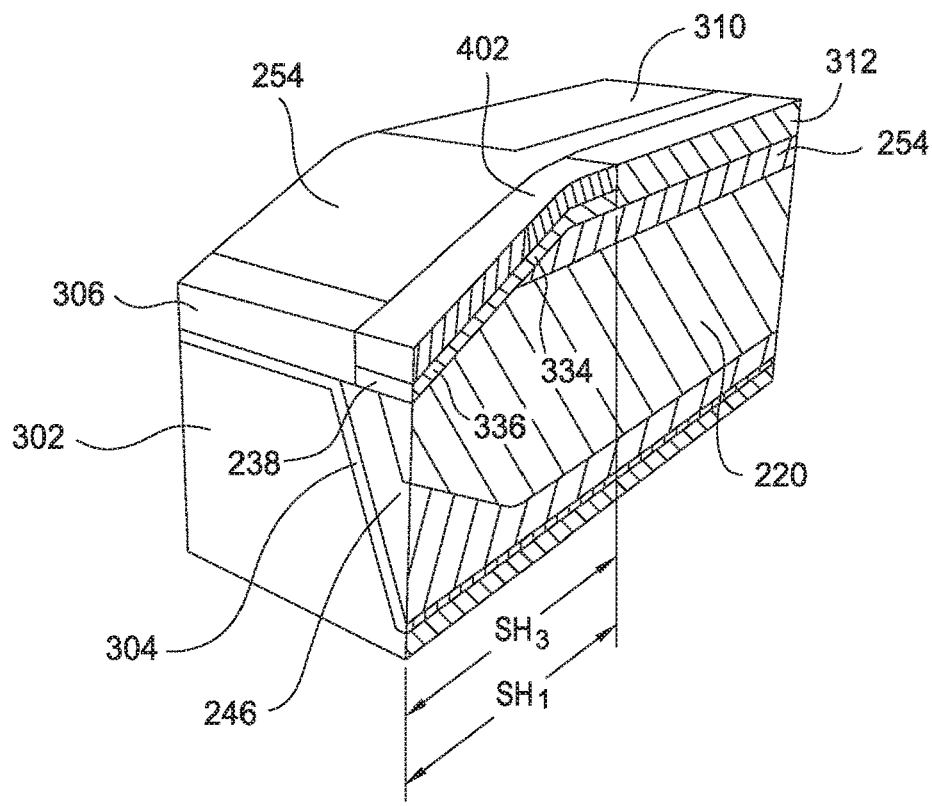
FIG. 4B is a perspective cross sectional view of the portion the write head of FIG. 4A according to one embodiment.

FIG. 4B is a perspective cross sectional view of the portion the write head 210 of FIG. 4A according to one embodiment. As shown in FIG. 4B, the seed layer 238 has the stripe height $SH_1$ that is substantially the same as a stripe height $SH_3$ of the non-magnetic gap layer 402. Thus, the dielectric layer 312 is butted against both the seed layer 238 and the non-magnetic gap layer 402, and there is no dielectric material 254 disposed between the non-magnetic gap layer 402 and the dielectric layer 312. As shown in FIG. 4B, the third portion 334 extends from the dielectric layer 312 to the dielectric layers 306, and the fourth portion 336 extends from the third portion 334 to the MFS 212.

Figure 4C:
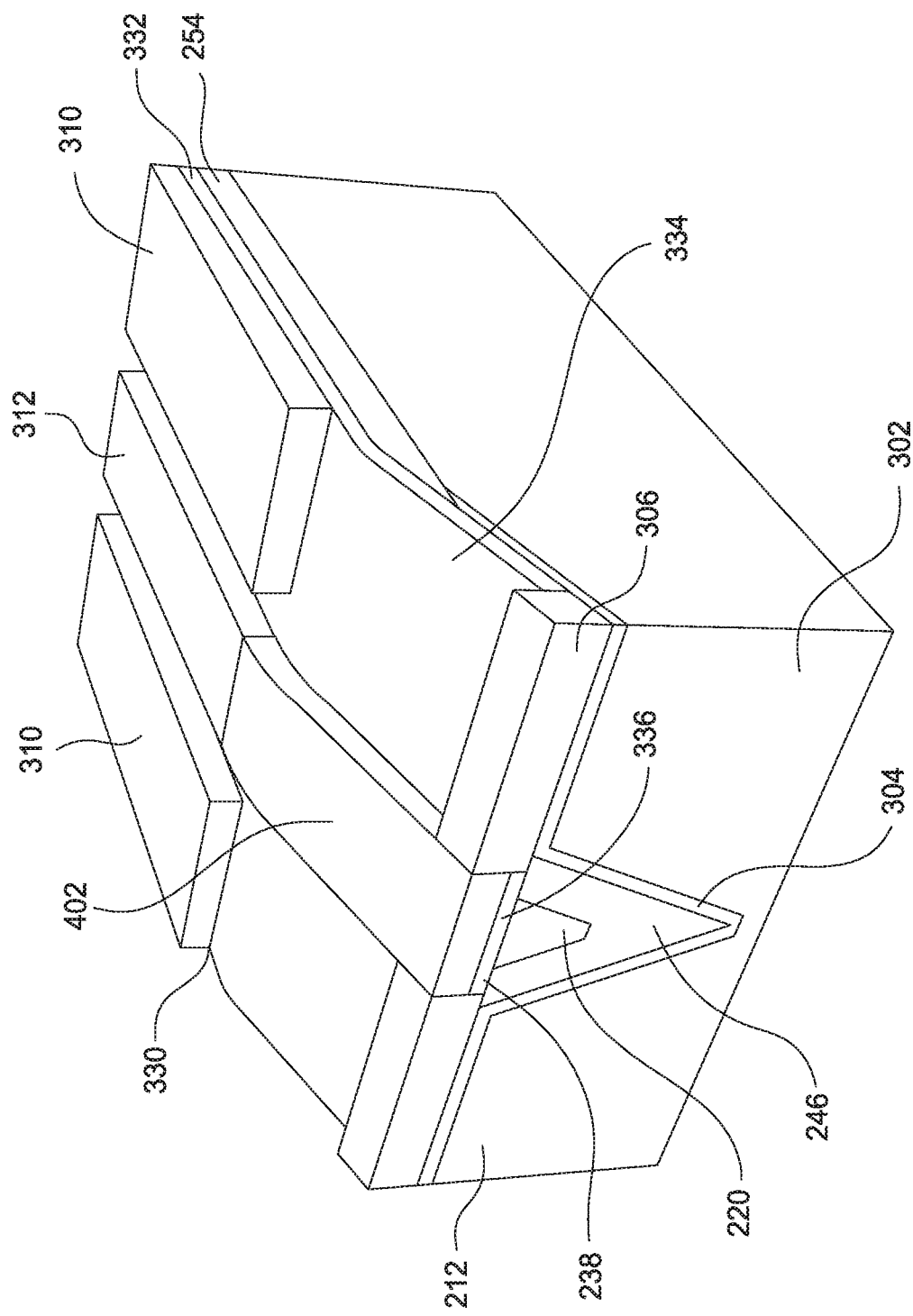
FIG. 4C is a perspective view of a portion of the write head of FIG. 4A according to one embodiment.

FIG. 4C is a perspective view of a portion of the write head 210 of FIG. 4A according to one embodiment. The dielectric material 254 disposed on the seed layer 238 is omitted to better illustrate the seed layer 238. As shown in FIG. 4C, the seed layer 238 includes the first, second, third, and fourth portions 330, 332, 334, 336, and the non-magnetic gap layer 402 is disposed on the third portion 334 and the fourth portion 336.

Figure 5A:
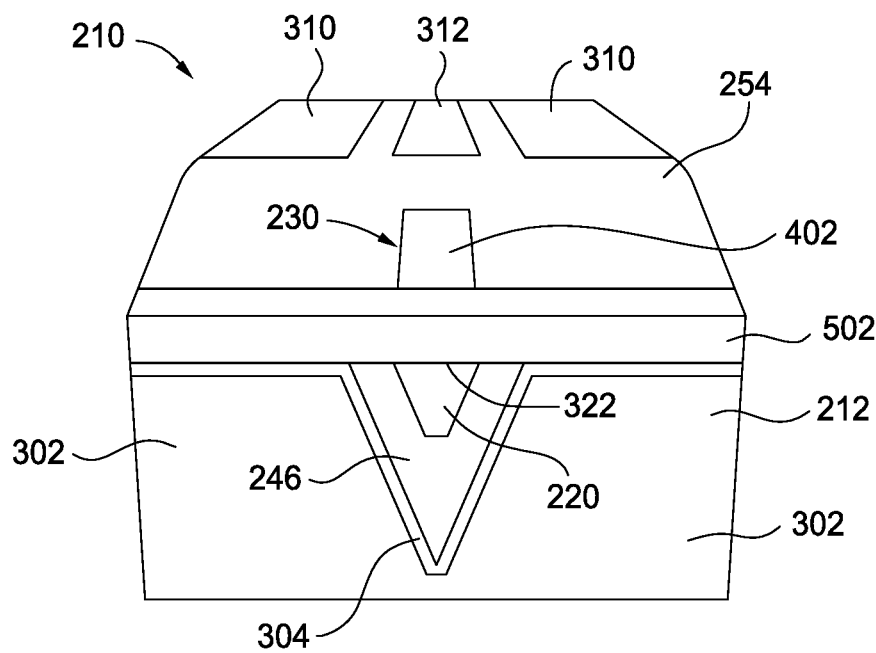
FIG. 5A is a perspective MFS view of a portion of a write head of FIG. 2 according to one embodiment.

FIG. 5A is a perspective MFS view of a portion of the write head 210 of FIG. 2 according to one embodiment. As shown in FIG. 5A, the write head 210 includes the main pole 220, the structure 230 including the non-magnetic gap layer 402, the non-magnetic electrically conductive structure 246, the dielectric material 304, the dielectric material 254, the dielectric layer 312, the electrical leads 310, the side shields 302, and a dielectric layer 502 disposed at the MFS 212. The dielectric layer 502 may be fabricated from the same material as the dielectric layers 306. The dielectric layer 502 is disposed on the dielectric material 304, the non-magnetic electrically conductive structure 246, and the main pole 220. The dielectric layer 502 is in contact with the surface 322 of the main pole 220, as shown in FIG. 5A. The structure 230 is recessed from the MFS 212.

Figure 5B:
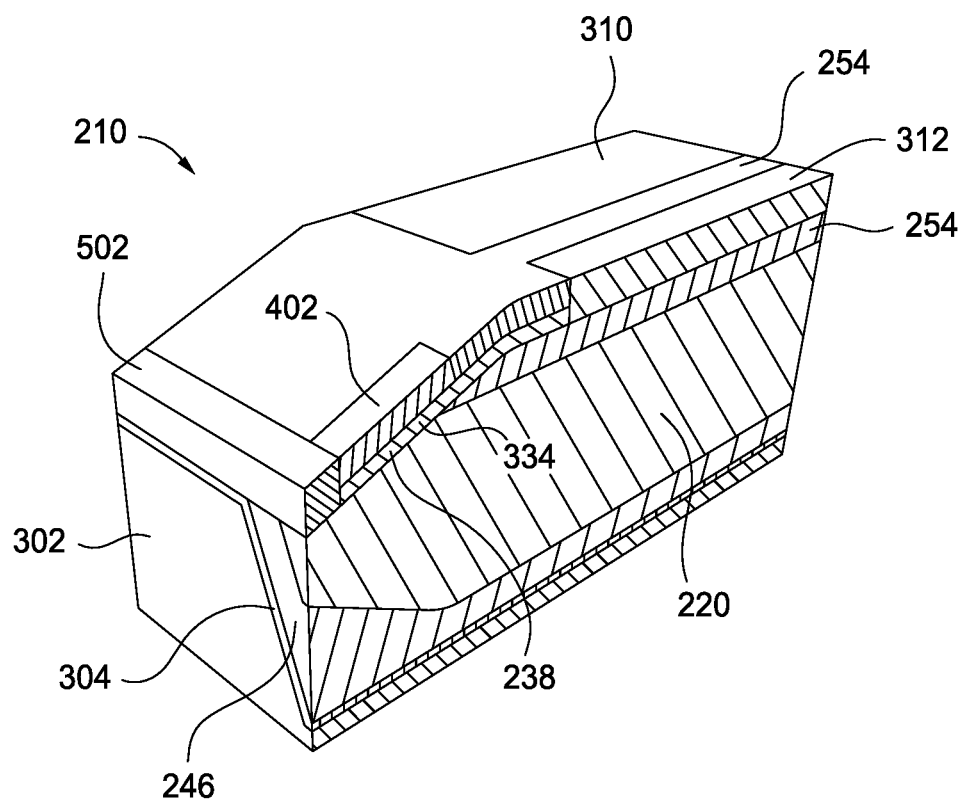
FIG. 5B is a perspective cross sectional view of the portion the write head of FIG. 5A according to one embodiment.

FIG. 5B is a perspective cross sectional view of the portion the write head 210 of FIG. 5A according to one embodiment. As shown in FIG. 5B, both the seed layer 238 and the non-magnetic gap layer 402 are recessed from the MFS 212. The third portion 334 extends from the dielectric layer 312 to the dielectric layer 502, and the fourth portion 336 is not present.

Figure 5C:
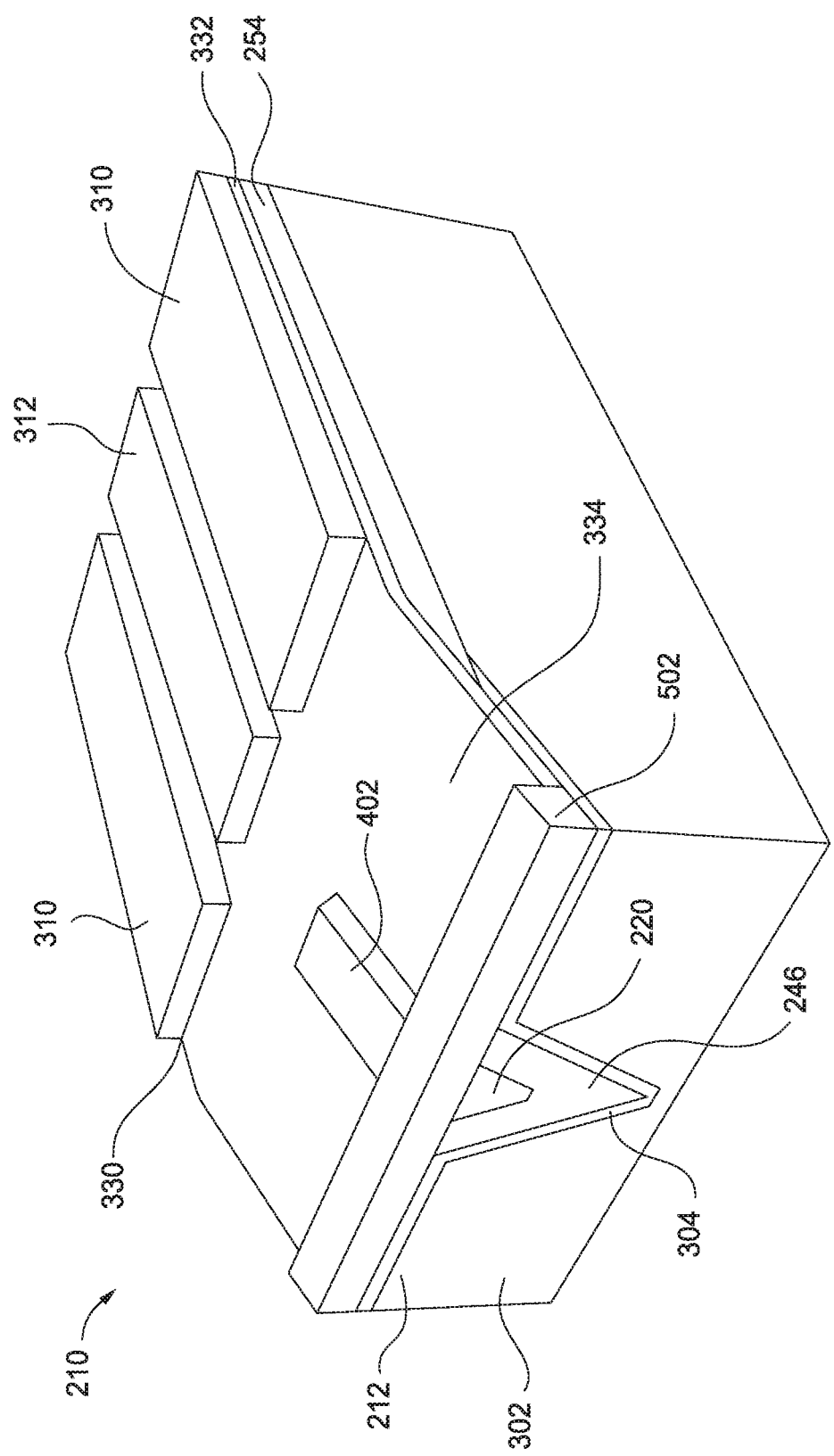
FIG. 5C is a perspective view of a portion of the write head of FIG. 5A according to one embodiment.

FIG. 5C is a perspective view of a portion of the write head 210 of FIG. 5A according to one embodiment. The dielectric material 254 disposed on the seed layer 238 is omitted to better illustrate the seed layer 238. As shown in FIG. 5C, the seed layer 238 includes the first, second, and third portions 330, 332, 334. The seed layer 238 does not include the fourth portion 336 (FIG. 4C) that extends from the third portion 334 to the MFS 212. The non-magnetic gap layer 402 is disposed on the third portion 334.

Figure 6A:
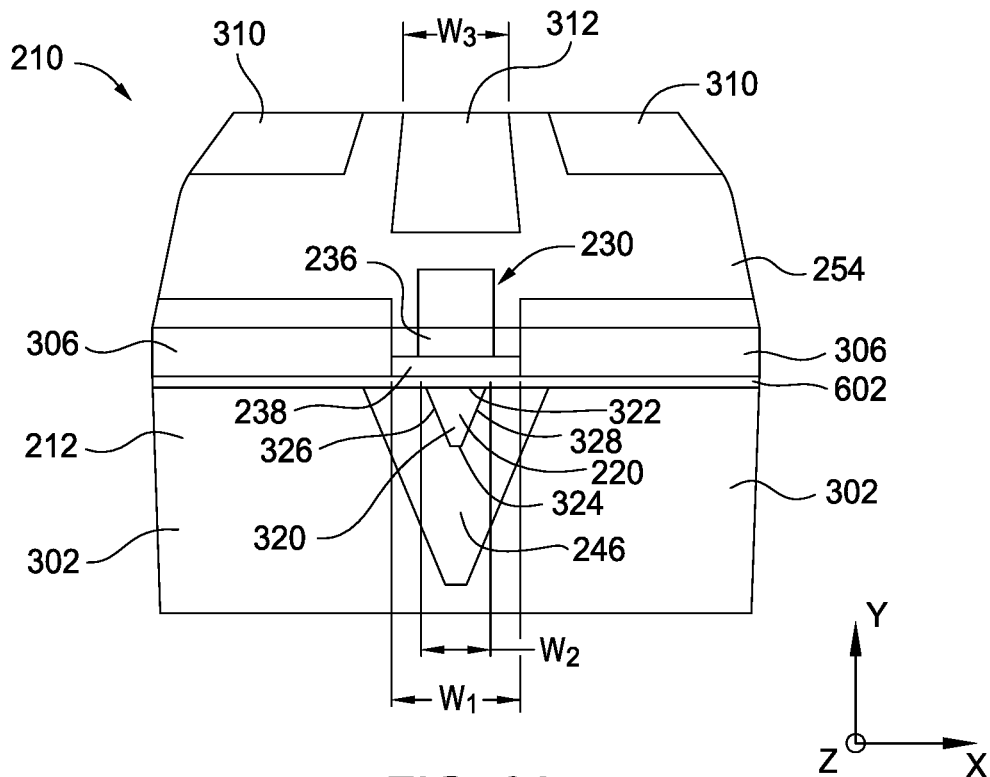
FIG. 6A is a perspective MFS view of a portion of a write head of FIG. 2 according to one embodiment.

FIG. 6A is a perspective MFS view of a portion of the write head 210 of FIG. 2 according to one embodiment. As shown in FIG. 6A, the write head 210 includes the main pole 220, the structure 230 disposed on the main pole 220, the non-magnetic electrically conductive structure 246 surrounding at least a portion of the main pole 220, the dielectric material 254, the dielectric layers 306, the dielectric layer 312, the electrical leads 310, the side shields 302 surrounding the non-magnetic electrically conductive structure 246, and a dielectric layer 602 disposed between the side shields 302 and the dielectric layers 306. The dielectric layer 602 may be fabricated from the same material as the dielectric material 304. As shown in FIG. 6A, the dielectric material 304 is not present, and the side shields are in contact with the non-magnetic electrically conductive structure 246. The dielectric layer 602 is also disposed between the non-magnetic electrically conductive structure 246 and the structure 230 and between the main pole 220 and the structure 230. In one embodiment, a first current is flowed to the one or more layers 236 via the seed layer 238, and a second current is flowed to the main pole 220 from the side shields via the non-magnetic electrically conductive structure 246 during operation. In another embodiment, the second current is flowed to the side shields from the main pole via the non-magnetic electrically conductive structure 246. In addition to the improved write-ability provided by the one or more layers 236 as the first current is flowed to the one or more layers 236 from the seed layer 238, write-ability is further improved as the second current flowing into the non-magnetic electrically conductive structure 246.

Figure 6B:
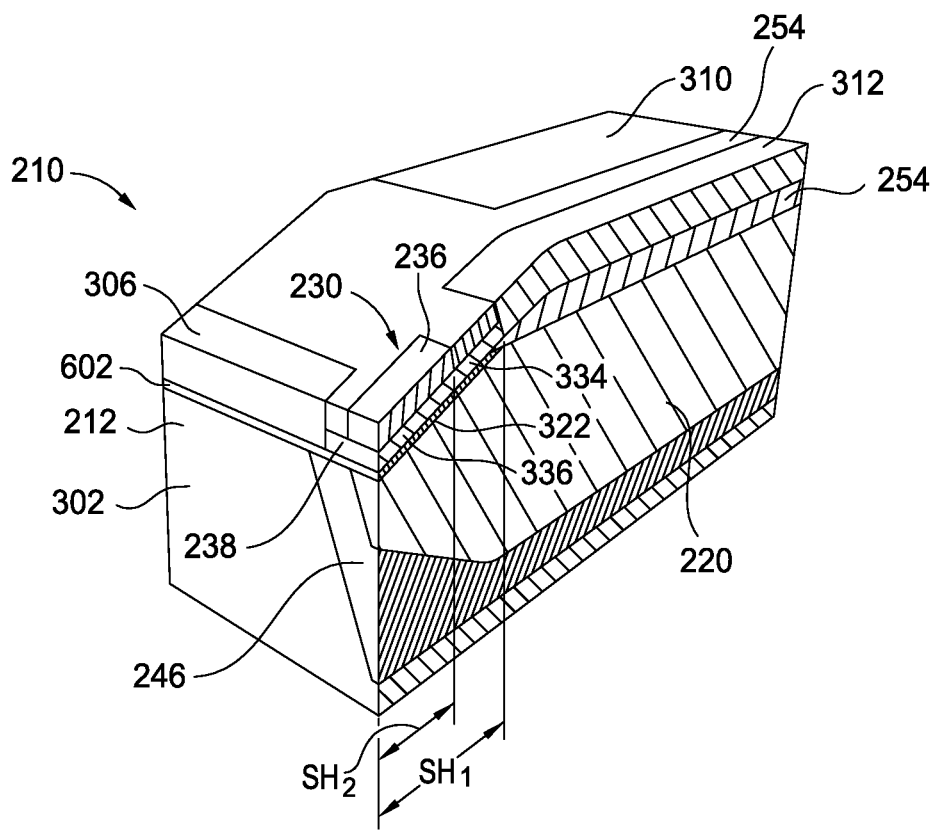
FIG. 6B is a perspective cross sectional view of the portion the write head of FIG. 6A according to one embodiment.

FIG. 6B is a perspective cross sectional view of the portion the write head 210 of FIG. 6A according to one embodiment. As shown in FIG. 6B, the dielectric layer 602 is disposed between dielectric layers 306 and the side shields 302, between the non-magnetic electrically conductive structure 246 and the structure 230, and between the main pole 220 and the structure 230. As shown in FIG. 6B, the third portion 334 extends from the dielectric layer 312 to the dielectric layers 306, and the fourth portion 336 extends from the third portion 334 to the MFS 212.

Figure 6C:
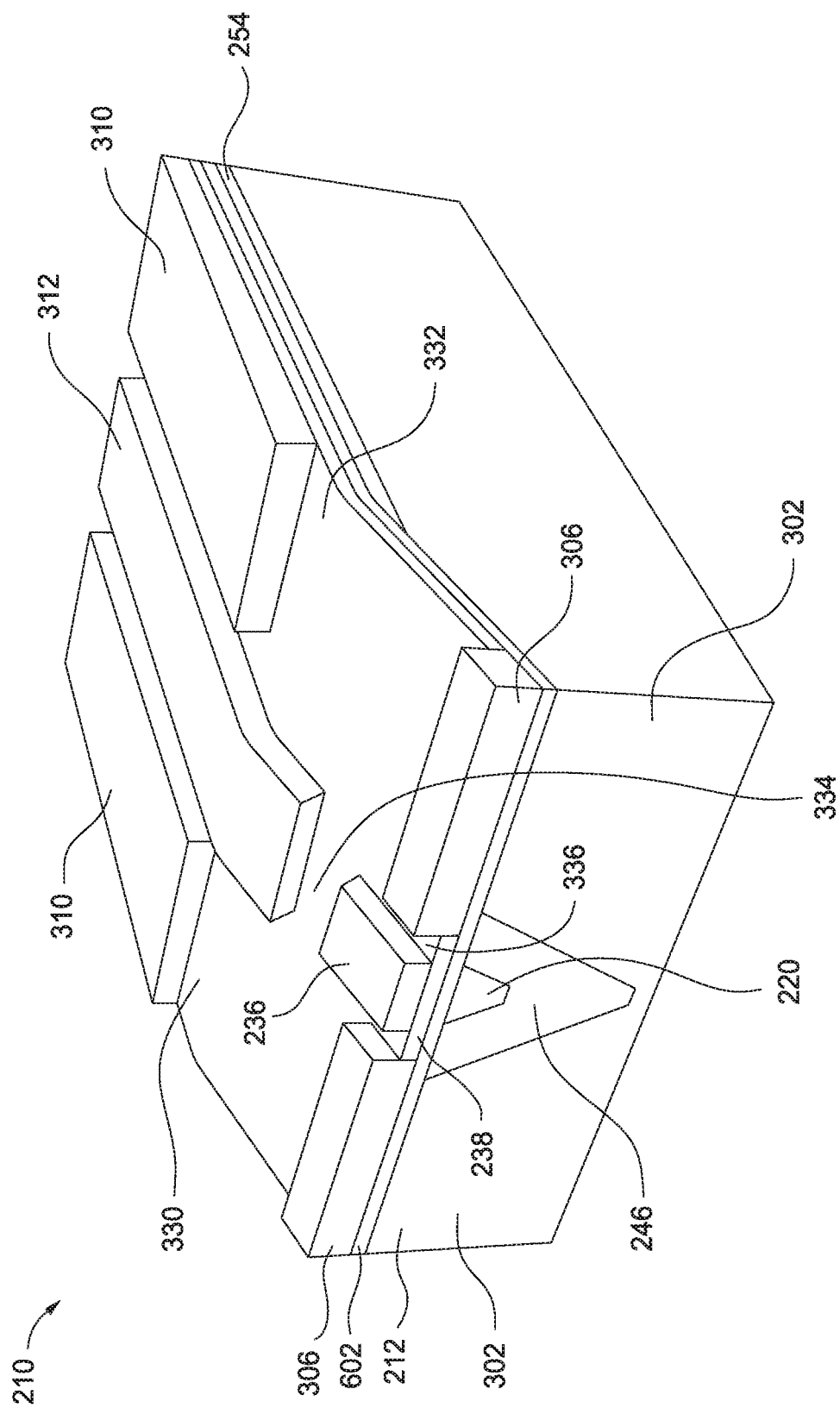
FIG. 6C is a perspective view of a portion of the write head of FIG. 6A according to one embodiment.

FIG. 6C is a perspective view of a portion of the write head 210 of FIG. 6A according to one embodiment. As shown in FIG. 6C, the dielectric layer 602 is disposed between the dielectric layers 306 and the side shields 302, between the seed layer 238 and the side shields 302, and between the seed layer 238 and the dielectric material 254.

Figure 7A:
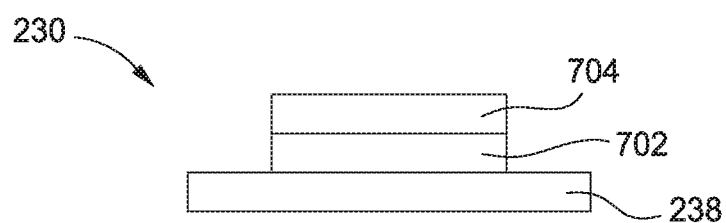
FIGS. 7A-7C are side views of a structure of FIG. 2 according to embodiments.
Figure 7B:
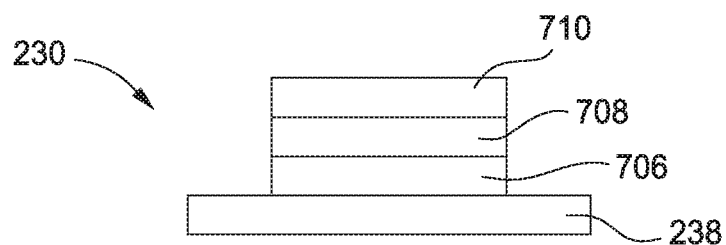
Figure 7C:
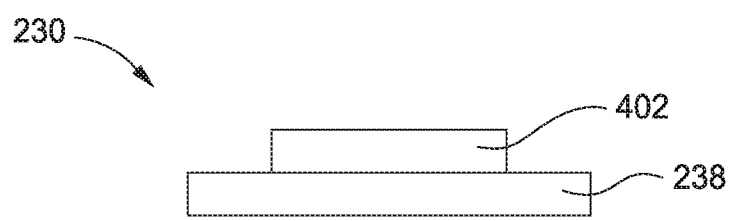

FIGS. 7A-7C are side views of the structure 230 of FIG. 2 according to embodiments. As shown in FIG. 7A, the structure 230 includes the seed layer 238, a spacer layer 702 disposed on the seed layer 238, and a magnetic layer 704 disposed on the spacer layer 702. The magnetic layer 704 is fabricated from a magnetic material, such as NiFe, CoMnGe, CoFe, or combinations thereof. In one embodiment, the magnetic layer 704 is a STL. The spacer layer is fabricated from a material such as Cu or AgSn. The spacer layer 702 and the magnetic layer 704 may be the one or more layers 236 (FIG. 2). During operation, the electrical current flows into the magnetic layer 704 via the seed layer 238, and the magnetic layer 704 is magnetized, leading to improved write-ability.

FIG. 7B is a side view of the structure 230 according to another embodiment. As shown in FIG. 7B, the structure 230 includes a first magnetic layer 706 disposed on the seed layer 238, an interlayer 708 disposed on the first magnetic layer 706, and a second magnetic layer 710 disposed on the interlayer 708. In one embodiment, the first magnetic layer 706 is a SPL, and the second magnetic layer is an FGL. In another embodiment, the first magnetic layer 706 is an FGL, and the second magnetic layer 710 is a SPL. The SPL may be a CoNi layer having perpendicular magnetic anisotropy. Other materials may be used as the SPL, such as CoMnGe, CoFe, NiFe, CoPt, CoCrPt, CoPd, FePt, CoFePd, TbFeCo, or combinations thereof. The FGL may be a CoFe layer. The interlayer 708 may be a metal layer having long spin diffusion length such as Au, Ag, AgSn, or Cu. The first magnetic layer 706, the interlayer 708, and the second magnetic layer 710 may be the one or more layers 236 (FIG. 2). The first magnetic layer 706, the interlayer 708, and the second magnetic layer 710 may form a STO. During operation, as the electrical current flows into the STO via the seed layer 238, the STO oscillates and provides an AC magnetic field to the recording medium. The AC magnetic field may reduce the coercive force of the recording medium, thus high quality recording by MAMR may be achieved.

FIG. 7C is a side view of the structure 230 according to yet another embodiment. As shown in FIG. 7C, the structure 230 includes the seed layer 238 and the non-magnetic gap layer 402 disposed on the seed layer 238. The non-magnetic gap layer 402 may be the one or more layers 236 (FIG. 2). During operation, as the electrical current flows into the non-magnetic gap layer 402, write-ability is improved.

The data storage device including the magnetic write head having a seed layer for guiding an electrical current to one or more layers formed on the seed layer and for heat dissipation of the one or more layers. The seed layer avoids current crowding at the MFS, which directs hot spots formed in the one or more layers away from the MFS. Furthermore, because the seed layer is fabricated from a metal, which is a thermally conductive material, the seed layer also helps heat dissipation of the one or more layers. As a result, the write-ability of the magnetic write head is improved, and the life-time of the magnetic write head is increased because corrosion of the magnetic write head is reduced.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
   a trailing shield;
   a main pole;
   a structure disposed between the main pole and the trailing shield, wherein the structure comprises:
      a first non-magnetic electrically conductive layer disposed on the main pole at a media facing surface, the first non-magnetic electrically conductive layer having a first stripe height; and
      one or more layers disposed on the first non-magnetic electrically conductive layer, the one or more layers having a second stripe height less than the first stripe height;
   an electrically conductive material disposed on the first non-magnetic electrically conductive layer at one or more locations recessed from the media facing surface;
   one or more dielectric layers disposed between the main pole and the trailing shield at the media facing surface; and
   a second non-magnetic electrically conductive layer surrounding at least a portion of the main pole, wherein at least one dielectric layer of the one or more dielectric layers is disposed between the second non-magnetic electrically conductive layer and the first non-magnetic electrically conductive layer.

2. The magnetic recording head of claim 1, wherein the first non-magnetic electrically conductive layer comprises copper, chromium, tantalum, ruthenium, tungsten, gold, silver, tin, molybdenum, iridium, platinum, or rhodium.

3. The magnetic recording head of claim 1, wherein the one or more layers comprises a magnetic layer and a spacer layer.

4. The magnetic recording head of claim 1, wherein the one or more layers comprises a first magnetic layer, a second magnetic layer, and an interlayer disposed between the first magnetic layer and the second magnetic layer.

5. The magnetic recording head of claim 1, wherein the electrically conductive material comprises two electrical leads.

6. A data storage device comprising the magnetic recording head of claim 1.

7. The magnetic recording head of claim 1, wherein the first non-magnetic electrically conductive layer has a first width, the one or more layers each has a second width, and the first width is greater than the second width.

8. The magnetic recording head of claim 1, wherein the one or more layers are disposed at the media facing surface, and wherein the first non-magnetic electrically conductive layer has a first width at the media facing surface, the main pole has a second width at the media facing surface, and the first width is greater than the second width.

9. A magnetic recording head, comprising:
   a trailing shield;
   a main pole;
   side shields surrounding at least a portion of the main pole; and
   a structure disposed between the trailing shield and the main pole, wherein the structure comprises:
      a first non-magnetic electrically conductive layer disposed over the main pole and the side shields, wherein the first non-magnetic electrically conductive layer is disposed over the side shields at a location recessed from a media facing surface; and
      one or more layers disposed on the first non-magnetic electrically conductive layer, wherein the first non-magnetic electrically conductive layer has a first width at the media facing surface, the one or more layers each has a second width at the media facing surface, and the first width is substantially greater than the second width.

10. The magnetic recording head of claim 9, wherein the first non-magnetic electrically conductive layer comprises copper, chromium, tantalum, ruthenium, tungsten, gold, silver, tin, molybdenum, iridium, platinum, or rhodium.

11. The magnetic recording head of claim 9, further comprising a dielectric layer disposed between the first non-magnetic electrically conductive layer and the side shields.

12. The magnetic recording head of claim 9, wherein the first non-magnetic electrically conductive layer is disposed over the main pole at the media facing surface.

13. A data storage device comprising the magnetic recording head of claim 9.

14. The magnetic recording head of claim 9, further comprising:
   one or more dielectric layers disposed between the main pole and the trailing shield at the media facing surface; and
   a second non-magnetic electrically conductive layer surrounding at least a portion of the main pole, wherein the second non-magnetic electrically conductive layer is disposed in contact with the first non-magnetic electrically conductive layer at the media facing surface.

15. The magnetic recording head of claim 9, further comprising an electrically conductive material disposed on the first non-magnetic electrically conductive layer at one or more locations recessed from the media facing surface.

16. The magnetic recording head of claim 9, further comprising two electrical leads disposed on the first non-magnetic electrically conductive layer, wherein the first non-magnetic electrically conductive layer has a first stripe height, the one or more layers have a second stripe height, and the first stripe height is greater than the second stripe height.

17. The magnetic recording head of claim 9, wherein the first non-magnetic electrically conductive layer comprises a first portion, a second portion separated from the first portion by a dielectric layer, and a third portion connecting the first portion and the second portion, wherein the first portion and the second portion are recessed from the media facing surface.

18. A magnetic recording head, comprising:
   a trailing shield;
   a main pole;
   side shields surrounding at least a portion of the main pole; and
   a structure disposed between the trailing shield and the main pole, wherein the structure comprises:

a non-magnetic electrically conductive layer disposed over the main pole and the side shields, wherein the non-magnetic electrically conductive layer comprises a first portion, a second portion separated from the first portion by a first dielectric layer, and a third portion connecting the first portion and the second portion, wherein the first portion and the second portion are recessed from a media facing surface, and the third portion is disposed over the main pole and the side shields at locations recessed from the media facing surface; and one or more layers disposed on the non-magnetic electrically conductive layer.

19. The magnetic recording head of claim 18, wherein the non-magnetic electrically conductive layer comprises copper, chromium, tantalum, ruthenium, tungsten, gold, silver, tin, molybdenum, iridium, platinum, or rhodium.

20. The magnetic recording head of claim 18, further comprising an electrically conductive material disposed on the first portion and the second portion of the non-magnetic electrically conductive layer.

21. The magnetic recording head of claim 18, wherein the non-magnetic electrically conductive layer further comprises a fourth portion disposed over the main pole at the media facing surface.

22. The magnetic recording head of claim 21, further comprising a second dielectric layer disposed on the non-magnetic electrically conductive layer, wherein the second dielectric layer is disposed between the one or more layers and the first dielectric layer, and the second dielectric layer is distinct from the first dielectric layer.

23. The magnetic recording head of claim 21, further comprising a second dielectric layer and a third dielectric layer, wherein the fourth portion of the non-magnetic electrically conductive layer is sandwiched between the second dielectric layer and the third dielectric layer.

24. The magnetic recording head of claim 23, wherein the first dielectric layer, the second dielectric layer, and the third dielectric layer each comprises a thermally conductive material.

25. The magnetic recording head of claim 18, further comprising a dielectric material disposed between the first dielectric layer and the main pole, wherein the dielectric material is fabricated from a material different from the first dielectric layer.

26. The magnetic recording head of claim 25, wherein the dielectric material is disposed between the first and second portions of the non-magnetic electrically conductive layer and the side shields.

27. The magnetic recording head of claim 18, wherein the one or more layers is a non-magnetic gap layer.

28. The magnetic recording head of claim 27, wherein the non-magnetic gap layer is recessed from the media facing surface.

29. A data storage device comprising the magnetic recording head of claim 18.

30. A magnetic recording head, comprising:
a main pole; and
a structure disposed on the main pole, wherein the structure comprises:
one or more layers; and
means for providing a path for a first electrical current to flow to the one or more layers through a non-magnetic electrically conductive layer of the structure disposed in contact with at least one of the one or more layers, wherein the non-magnetic electrically conductive layer has a substantially greater width than the one or more layers and the main pole at a media facing surface, and wherein the non-magnetic electrically conductive layer has a first stripe height, the one or more layers have a second stripe height, and the first stripe height is greater than the second stripe height.

31. The magnetic recording head of claim 30, wherein the one or more layers comprises a magnetic layer and a spacer layer.

32. The magnetic recording head of claim 30, wherein the one or more layers comprises a first magnetic layer, a second magnetic layer, and an interlayer disposed between the first magnetic layer and the second magnetic layer.

33. The magnetic recording head of claim 30, further comprising:
side shields surrounding at least a portion of the main pole; and
means for providing a path for a second electrical current to flow to the main pole from the side shields or to the side shields from the main pole.

34. The magnetic recording head of claim 33, wherein the one or more layers comprises a magnetic layer and a spacer layer.

35. The magnetic recording head of claim 33, wherein the one or more layers comprises a first magnetic layer, a second magnetic layer, and an interlayer disposed between the first magnetic layer and the second magnetic layer.

36. A data storage device comprising the magnetic recording head of claim 30.

* * * * *